Patented May 4, 1926.

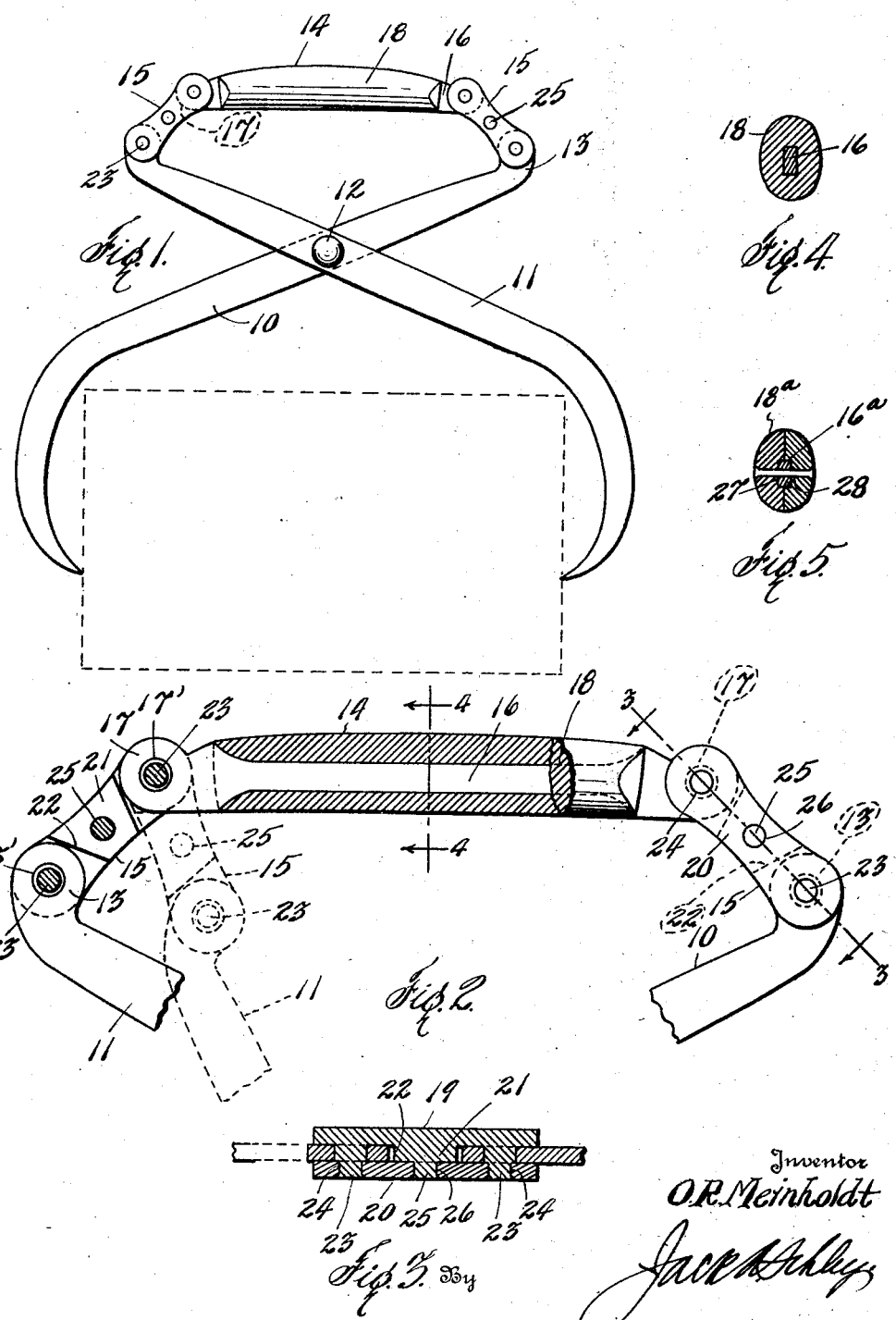

1,583,302

UNITED STATES PATENT OFFICE.

OTTO R. MEINHOLDT, OF DALLAS, TEXAS.

ICE TONGS.

Application filed October 10, 1925. Serial No. 61,670.

*To all whom it may concern:*

Be it known that I, OTTO R. MEINHOLDT, citizen of the United States of America, residing at Dallas, in the county of Dallas and State of Texas, have invented certain new and useful Improvements in Ice Tongs, of which the following is a specification.

This invention relates to new and useful improvements in ice tongs, and particularly has to do with ordinary ice tongs embodying my improved handle and links.

A frequent objection to the ordinary ice tongs is that the grappling arms spread laterally on their pivotal connections, which permits the arms to project above the said connections when extended. This action often causes the user's hand or fingers to be pinched between the upper portions of the arms when the latter are retracted. Another common objection is that the user's fingers are often pinched between the upper portions of the grappling arms and the underside of the handle when said arms are disengaged and swing down due to the weight of same.

A particular feature of the invention resides in the connecting links which have means provided within themselves for preventing the arms from extending beyond a certain point when the same are disengaged and swing downward.

Another object of the invention is to provide a highly improved handle device for ice tongs in which means comprising a handle and connecting links, will prevent the hand and fingers from being pinched when the grappling arms of the tongs are extended.

Another object of the invention is to provide a device to be made of any suitable material which will be light in weight yet durable and adaptable to heavy and strenuous uses.

A further object of the invention is to provide a device which has freedom of operation, and in which the handle and grappling arms are pivoted in such a manner as to prevent lateral play therebetween.

A still further object of the invention is to provide a handle to be made of aluminum, wood or any suitable material which may be gripped with ease and also afford a comfortable holding means to the hand of the user.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a side elevation of a pair of ice tongs provided with a handle and connecting links constructed in accordance with my invention, Fig. 2 is an enlarged view of the handle and links, parts being in section, Fig. 3 is a cross sectional view taken on the line 3—3 of Fig. 2, Fig. 4 is a cross sectional view taken on the line 4—4 of Fig. 2, and Fig. 5 is a cross sectional view of a modified form of the handle.

In the drawings the numeral 10 designates one of the grappling arms of an ordinary pair of ice tongs and 11 the other arm. The arms are pivoted in the usual manner by means of a double headed rivet 12 or any other suitable means. The arms are provided with inwardly directed ears 13 at their upper ends, each of said ears having an aperture 13' in their central portion.

In carrying out my invention the principal parts comprise a handle 14 and a pair of connecting links 15 which may be made of any suitable material. However, I prefer to make the handle of aluminum or wood and the connecting links of bronze or brass. It is obvious that by the usage of these different materials the possibility of the pivotal connections binding or corroding will be eliminated.

The handle comprises a bar 16 which is enlarged at each end forming upwardly curved ears 17 having apertures 17' provided in the central portion thereof. The bar extends entirely across from one of the connecting links to the other, thus affording greater strength. The bar which is preferably made of bronze because of its anti-friction qualities is enacted within any suitable material 18 such as aluminum, wood or rubber and is finished to conform with the user's hand, thereby affording a more comfortable holding means.

The preferred material 18 is tapered inwardly at each end to conform with the width of the bar 16 thus affording neatness. It is apparent by this construction that water cannot seep into the handle, rusting or corroding the pivotal connections as is a common occurrence of the old hollow type handle.

The links 15 are made of any suitable material and comprise a male member 19 and a female member 20. The member 19 has a central boss 21 having upwardly diverging sides 22. This boss is provided to limit the upward swing of the upper portion of the grappling arms, as the inward side of the boss engages with the underside of the handle bar as shown in dotted lines (Fig. 2). By this arrangement it is evident that the user's hand or fingers cannot be pinched between the links and handle. Shouldered pins 23 are formed integral with the member 19 at each end, and are adapted to be received in apertures 14 of the grappling arms and apertures 18 of the handle bar 16, thus providing pivotal connections for said parts.

The pins 23 are received in corresponding apertures 24 in the member 20 and a center or intermediate pin 25 is received in a similar aperture 26 thus affording greater strength to the complete link when the pins are upset. As the apertures 24 of the member 20 are substantially the same diameter as the other portion of the pins 23 and the collar of said pins are on the same plane as the boss 21, it is obvious that the ends of the links cannot bind when the pins are upset to form the pivotal connection between the handle and the grappling arms.

In Fig. 5 I have shown a modified form of the handle in which a similar handle bar 16ᵃ is employed having the same function as the bar 16 in the above specification. The grasping portion 18ᵃ of the handle is made of any suitable material, preferably light weight material such as aluminum and the like. The handle is made in two sections, each section having a corresponding internal groove 27 in which the handle bar 16ᵃ snugly fits. The sections may either be welded together or fastened by means of rivets 28.

It will be readily seen that when the tongs are disengaged and the grappling arms swing downward, as is shown in dotted lines, (Fig. 2) the hand of the user cannot be pinched as the inward side 22 of the boss engages against the side of the ear 17 of the handle bar. By this arrangement it is obvious that the links are prevented at all times from closing in upon the handle when the arms are disengaged, thus the hazard of the user's hand being pinched is eliminated.

It is also obvious that the possibility of lateral displacement of the pivotal connections is greatly minimized, as the ears of the handle and grappling arms are snugly and firmly held in alinement by means of the rigid construction of the connecting links.

Various changes in the size and shape of the different parts, as well as modifications and alterations may be made within the scope of the appended claims.

What I claim, is:

1. In an ice tongs, a handle, links pivoted in pairs to each end of the handle, grappling arms pivoted to the opposite ends of the links, and a central boss integral with one link of each pair for spacing the links apart and also for engaging the handle for limiting the closing swing of the grappling arms.

2. In an ice tongs, a handle, links pivoted in pairs to each end of the handle, grappling arms pivoted to the opposite ends of the links, a central boss integral with one link of each pair for spacing the links apart and also for engaging the handle for limiting the closing swing of the grappling arms, and one link of each pair having shouldered pins at each end, the complementary link having apertures for receiving the reduced ends of said pins.

3. In an ice tongs, a handle, links pivoted in pairs to each end of the handle, grappling arms pivoted to the opposite ends of the links, a central boss integral with one link of each pair for spacing the links apart and also for engaging the handle for limiting the closing swing of the grappling arms, one link of each pair having shouldered pins at each end, the completmentary link having apertures for receiving the reduced ends of said pins, and a fastening element carried by each boss and engaging the complementary link for securing the links together.

4. In an ice tongs, a handle, links pivoted in pairs to each end of the handle, one link of each pair having a central boss and having its ends inclined so as to converge, shouldered pins integral with each end of one of said links of each pair to serve as pivotal connections, and a pin integral with each boss, the complementary link of each pair having apertures for receiving said pins and also an aperture for receiving the reduced portion of the shouldered pin.

In testimony whereof I affix my signature.

OTTO R. MEINHOLDT.